(12) United States Patent
Maurer et al.

(10) Patent No.: US 8,708,075 B2
(45) Date of Patent: Apr. 29, 2014

(54) FRONT END STRUCTURE FOR VEHICLE

(75) Inventors: Michael W. Maurer, Dublin, OH (US); Christopher Meeks, Greensboro, NC (US); Jason A. Widmer, Marysville, OH (US); Sukwon Kim, Camp Hill, PA (US); Karl Forster, Powell, OH (US); Jeremy Paul Lucas, Delaware, OH (US); Ryan L. Kabbes, Delaware, OH (US); Kyle Stephen Mihok, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 13/351,034

(22) Filed: Jan. 16, 2012

(65) Prior Publication Data

US 2013/0180789 A1 Jul. 18, 2013

(51) Int. Cl.
*B60K 11/08* (2006.01)
*B60R 19/52* (2006.01)

(52) U.S. Cl.
CPC ............... *B60K 11/08* (2013.01); *B60R 19/52* (2013.01)
USPC .................. 180/68.1; 296/193.09; 296/193.1

(58) Field of Classification Search
CPC ........ B60K 11/08; B60K 11/04; B62D 35/02; B60R 19/52
USPC ........ 180/68.1, 68.2, 68.3; 296/193.09, 193.1
See application file for complete search history.

(56) References Cited

U.S. PATENT DOCUMENTS

| | | | | |
|---|---|---|---|---|
| 2,191,599 A | * | 2/1940 | Valletta | 180/68.1 |
| 2,358,663 A | * | 9/1944 | Scott-Iversen | 180/68.2 |
| 2,913,065 A | * | 11/1959 | Lyon, Jr. | 180/68.1 |
| 3,205,964 A | * | 9/1965 | Henry-Biabaud | 180/68.1 |
| 3,933,136 A | * | 1/1976 | Burst | 123/41.58 |
| 4,114,714 A | * | 9/1978 | Fachbach et al. | 180/68.1 |
| 4,566,407 A | * | 1/1986 | Peter | 123/41.48 |
| 4,590,889 A | * | 5/1986 | Hiereth | 123/41.05 |
| 4,706,615 A | * | 11/1987 | Scadding | 123/41.01 |
| 4,748,943 A | * | 6/1988 | Mayer | 123/41.15 |
| 4,938,303 A | * | 7/1990 | Schaal et al. | 180/68.1 |
| 4,976,489 A | * | 12/1990 | Lovelace | 296/180.1 |
| 5,046,550 A | * | 9/1991 | Boll et al. | 165/41 |
| 5,054,567 A | * | 10/1991 | Hoffman | 180/68.2 |
| 5,209,285 A | * | 5/1993 | Joshi | 165/41 |
| 5,476,138 A | * | 12/1995 | Iwasaki et al. | 165/41 |
| 5,490,572 A | * | 2/1996 | Tajiri et al. | 180/65.1 |
| 5,551,505 A | * | 9/1996 | Freeland | 165/41 |

(Continued)

FOREIGN PATENT DOCUMENTS

| | | | | |
|---|---|---|---|---|
| DE | 3600190 | | 7/1986 | |
| DE | 3600190 | A1 * | 7/1986 | ............ B60K 11/04 |
| EP | 0175655 | | 3/1986 | |
| WO | WO 2011151917 | A1 * | 12/2011 | |

*Primary Examiner* — Hau Phan
*Assistant Examiner* — Jacob Meyer
(74) *Attorney, Agent, or Firm* — Rankin, Hill & Clark LLP

(57) ABSTRACT

A front end structure for a vehicle includes a facia member defining a forward end of an engine compartment of the vehicle and a radiator disposed in the engine compartment rearwardly spaced from the facia member. A duct member is interposed between the facia member and the radiator. The duct member at least partially blocks the radiator and defines a duct passage extending from an underside opening of the vehicle to the radiator. At least one duct opening is defined in the duct member for supplementing air flow to the radiator from the underside opening.

18 Claims, 5 Drawing Sheets

(56) References Cited

U.S. PATENT DOCUMENTS

| | | | |
|---|---|---|---|
| 5,816,350 A * | 10/1998 | Akira et al. | 180/68.1 |
| 6,276,482 B1 * | 8/2001 | Moriya et al. | 180/229 |
| 6,302,228 B1 * | 10/2001 | Cottereau et al. | 180/68.1 |
| 6,390,217 B1 * | 5/2002 | O'Brien et al. | 180/68.6 |
| 6,405,819 B1 * | 6/2002 | Ohkura et al. | 180/68.1 |
| 6,626,483 B2 * | 9/2003 | Ozawa et al. | 296/193.09 |
| 6,659,220 B2 * | 12/2003 | Kobayashi | 180/68.6 |
| 6,988,574 B2 * | 1/2006 | Jones | 180/68.1 |
| 7,163,073 B2 * | 1/2007 | Schmid et al. | 180/68.3 |
| 7,290,630 B2 * | 11/2007 | Maeda et al. | 180/68.4 |
| 7,296,645 B1 * | 11/2007 | Kerner et al. | 180/68.1 |
| 7,451,844 B2 * | 11/2008 | Kunikata | 180/68.1 |
| 7,484,584 B1 * | 2/2009 | Kerner et al. | 180/68.1 |
| 7,644,979 B2 * | 1/2010 | Bauernfeind | 296/193.09 |
| 7,717,204 B2 * | 5/2010 | Kondou et al. | 180/68.1 |
| 8,091,516 B2 * | 1/2012 | Preiss | 123/41.05 |
| 8,091,668 B2 * | 1/2012 | Amano et al. | 180/68.1 |
| 8,196,978 B2 * | 6/2012 | Shin | 293/115 |
| 8,267,209 B2 * | 9/2012 | Kuwabara et al. | 180/68.4 |
| 8,316,974 B2 * | 11/2012 | Coel et al. | 180/68.1 |
| 8,434,579 B2 * | 5/2013 | Widmer et al. | 180/68.1 |
| 8,443,921 B2 * | 5/2013 | Charnesky et al. | 180/68.1 |
| 8,479,852 B2 * | 7/2013 | Maurer et al. | 180/68.2 |
| 8,479,853 B2 * | 7/2013 | Verbrugge | 180/68.2 |
| 8,479,855 B2 * | 7/2013 | Kim et al. | 180/68.3 |
| 8,491,050 B2 * | 7/2013 | Bauernfeind et al. | 296/193.09 |
| 2003/0010558 A1 * | 1/2003 | Buell et al. | 180/229 |
| 2003/0183432 A1 * | 10/2003 | Suzuki | 180/68.1 |
| 2005/0023057 A1 * | 2/2005 | Maeda et al. | 180/68.1 |
| 2006/0102399 A1 * | 5/2006 | Guilfoyle et al. | 180/68.1 |
| 2008/0017138 A1 * | 1/2008 | Rogg | 123/41.05 |
| 2009/0139786 A1 * | 6/2009 | Lee | 180/68.1 |
| 2009/0256397 A1 * | 10/2009 | Bauernfeind | 296/193.1 |
| 2010/0282533 A1 * | 11/2010 | Sugiyama | 180/68.1 |
| 2011/0181075 A1 * | 7/2011 | Glickman | 296/193.09 |
| 2011/0297468 A1 * | 12/2011 | Coel et al. | 180/68.1 |
| 2012/0007389 A1 * | 1/2012 | Bauernfeind et al. | 296/193.1 |
| 2012/0024611 A1 * | 2/2012 | Ajisaka | 180/68.1 |
| 2012/0049545 A1 * | 3/2012 | Davis et al. | 293/115 |
| 2012/0199316 A1 * | 8/2012 | Maurer et al. | 165/44 |
| 2012/0323448 A1 * | 12/2012 | Charnesky et al. | 701/49 |
| 2012/0325324 A1 * | 12/2012 | Widmer et al. | 137/1 |
| 2013/0069389 A1 * | 3/2013 | Meeks et al. | 296/180.1 |
| 2013/0081888 A1 * | 4/2013 | Charnesky et al. | 180/68.3 |
| 2013/0133963 A1 * | 5/2013 | Ajisaka | 180/68.1 |
| 2013/0180789 A1 * | 7/2013 | Maurer et al. | 180/68.1 |
| 2013/0200655 A1 * | 8/2013 | Missig et al. | 296/193.09 |

* cited by examiner

FRONT END STRUCTURE FOR VEHICLE

BACKGROUND

The present disclosure generally relates to a front end structure for a vehicle, and particularly relates to a front end structure for a vehicle having a duct member defining a duct passage to a vehicle's radiator and at least one duct opening defined in the duct member for supplementing air flow to the radiator.

All vehicles are being pushed to increase aerodynamics and/or fuel economy. Presently, the open area through a vehicle's front facia, which is often used for cooling, has a large negative impact on vehicle aerodynamics. Accordingly, there is a constant push to reduce the total amount of open area on vehicles and thereby increase aerodynamics and improve fuel economy. Unfortunately, this usually has negative impacts to engine cooling.

In view of the foregoing, a bottom breather duct is sometimes employed, which can generally reduce the amount of open facia area required for air flow to the radiator while still providing an air flow to the radiator. In particular, a bottom breather application allows air to be pulled in from the bottom of the vehicle, resulting in less drag. An example of a bottom breather application is the provision of an air inlet opening disposed on an underside of the vehicle and a duct passageway formed from the air inlet to the radiator so that air flow entering the inlet can flow to the radiator for cooling thereof.

Ducting from the underside of the vehicle has proven to significantly increase the efficiency of air entering the vehicle, but such ducting is not without its drawbacks in conventional front end structures. More particularly, there is sometimes a problem with such ducting in that insufficient air flow from the bottom ducting sometimes occurs to the radiator.

SUMMARY

According to one aspect, a front end structure for a vehicle includes a facia member defining a forward end of an engine compartment of the vehicle and a radiator disposed in the engine compartment rearwardly spaced from the facia member. A duct member is interposed between the facia member and the radiator. The duct member at least partially blocks the radiator and defines a duct passage extending from an underside opening of the vehicle to the radiator. At least one duct opening is defined in the duct member for supplementing air flow to the radiator from the underside opening.

According to another aspect, a vehicle front end includes a facia member defining a forward end of an engine compartment of a vehicle and a radiator disposed in the engine compartment rearwardly of the facia member. An underside air inlet opening is defined in an underside of the vehicle. A duct member extends upward from a leading edge of the underside air inlet opening and directs air flow entering the underside air inlet opening toward the radiator. An opening is defined in the duct member that allows a supplemental air flow to pass through the duct member to the radiator.

According to still another aspect, the method for supplying air flow to a radiator inside an engine compartment of a vehicle includes directing air flow from an underside air inlet opening of the vehicle to the radiator with a duct member, and directing supplemental air flow through a duct opening defined in the duct member to the radiator to supplement air flow from the underside air inlet opening.

DETAILED DESCRIPTION

Figure 1:
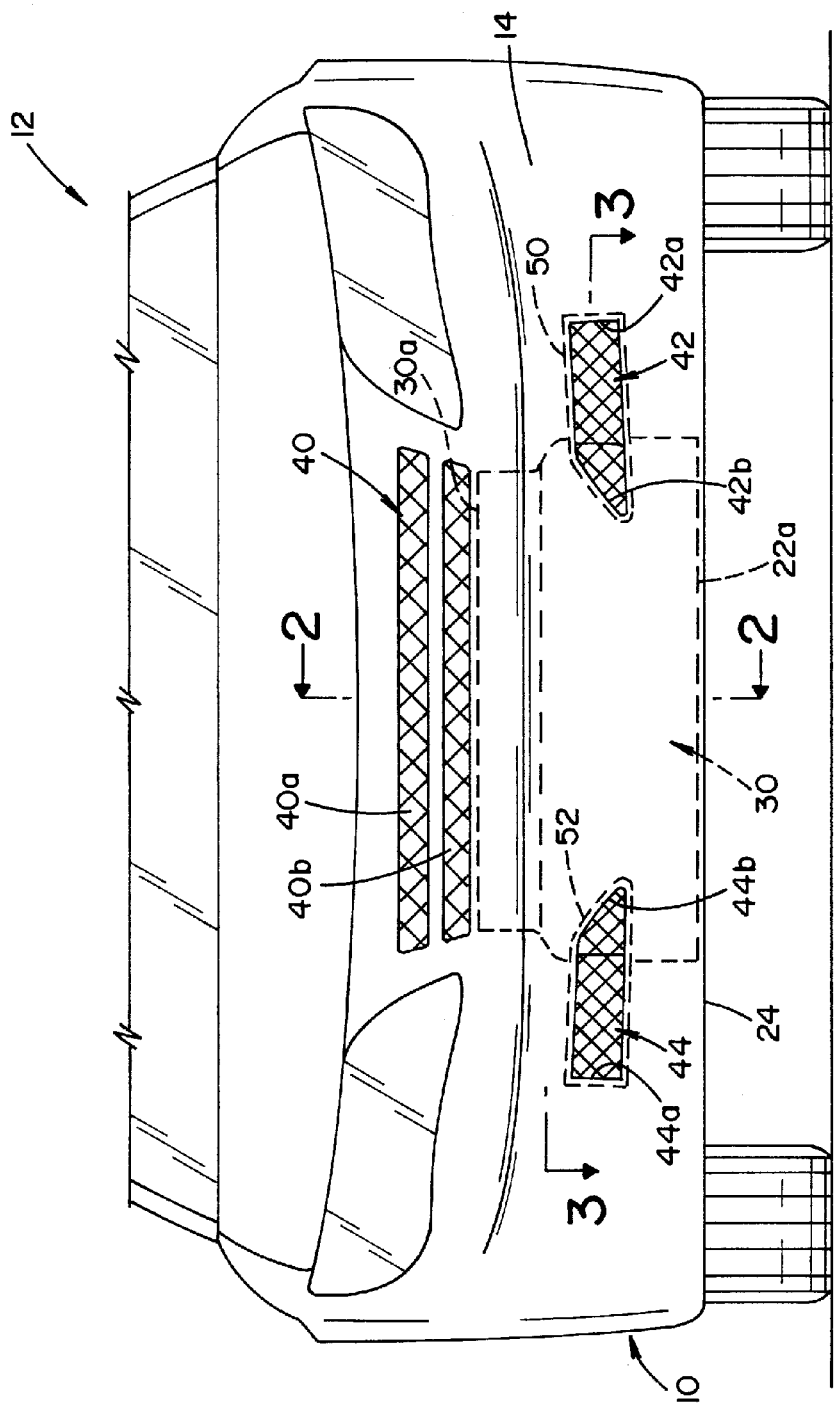
FIG. 1 is a front elevational view of a front end structure for a vehicle.
Figure 2:
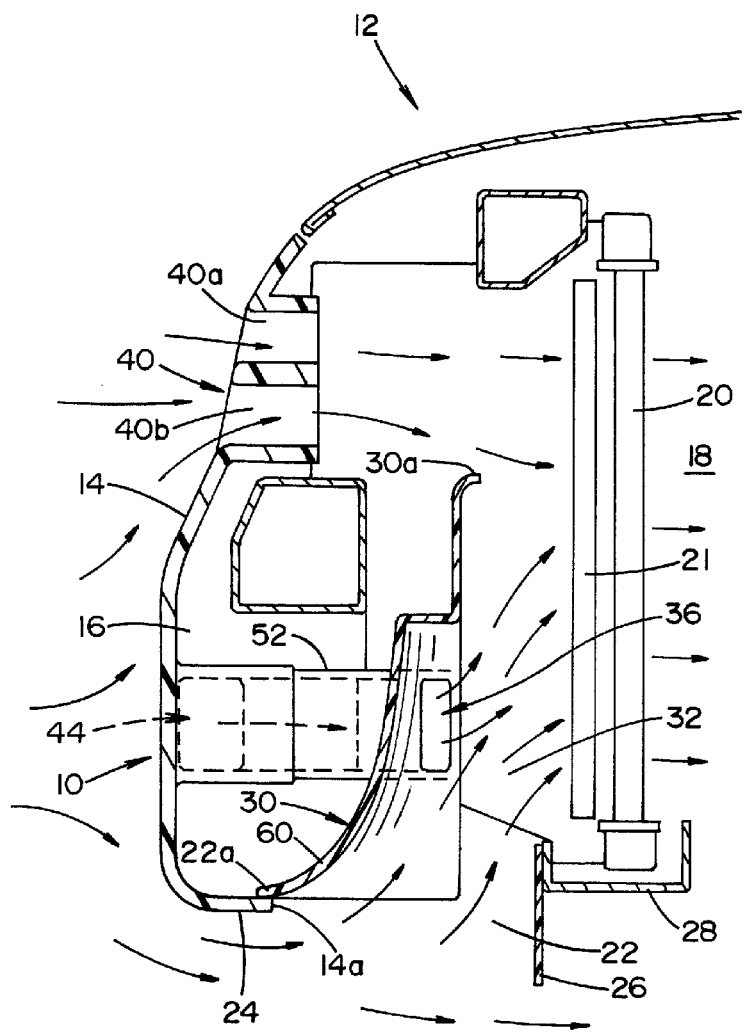
FIG. 2 is a cross-sectional view of the front end structure taken along the line 2-2 of FIG. 1.
Figure 3:
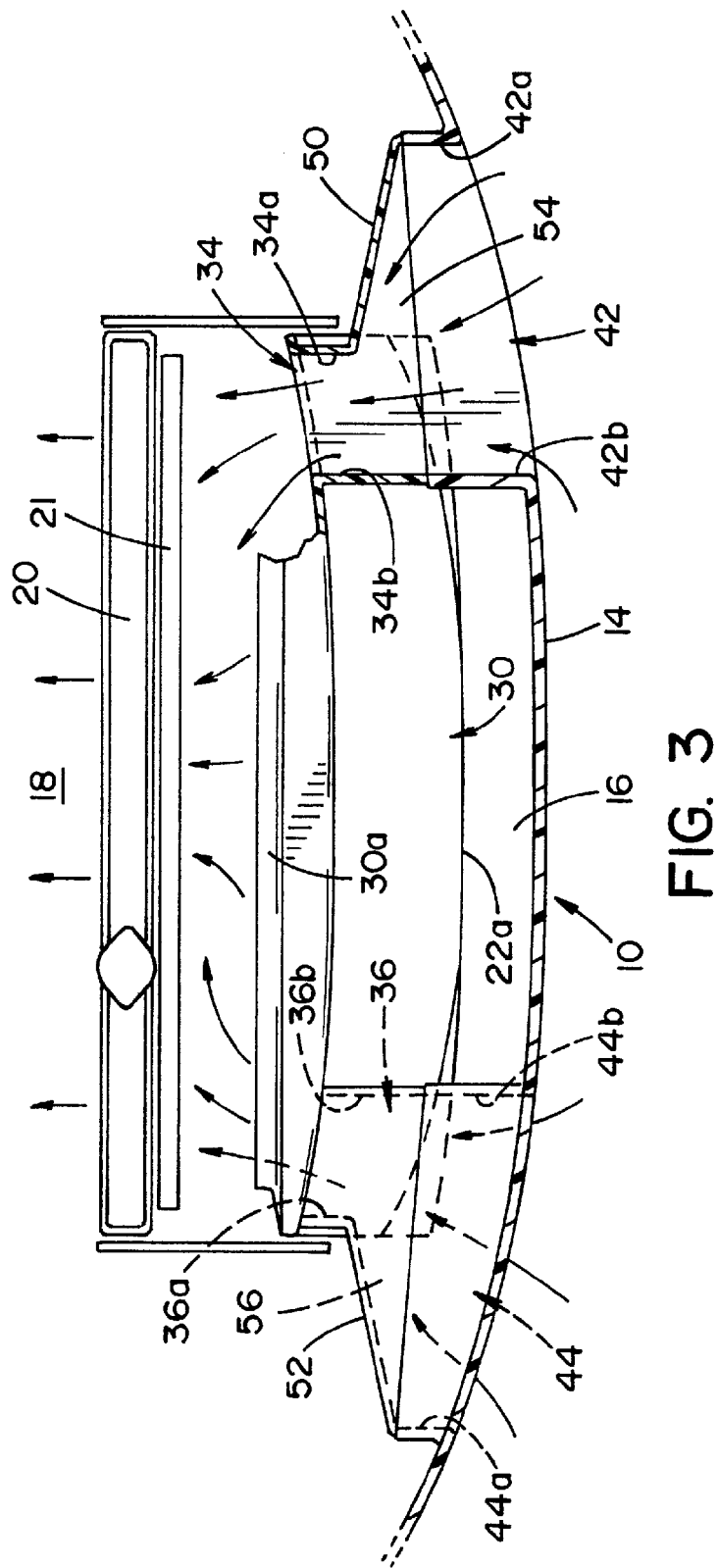
FIG. 3 is a cross-sectional view of the front end structure taken along the line 3-3 of FIG. 1.

Referring now to the drawings, wherein the showings are for purposes of illustrating one or more exemplary embodiments and not for purposes of limiting the same, FIGS. 1-3 illustrate a vehicle front end or front end structure 10 on a vehicle 12. The front end structure 10 includes a facia member 14 defining a forward end 16 of an engine compartment 18 of the vehicle 12. A radiator 20 is disposed in the engine compartment 18 rearwardly of the facia member 14, and particularly rearwardly spaced from the facia member 14. A condenser 21 can be disposed immediately forward of the radiator 20.

An underside air inlet opening 22 is defined in an underside 24 of the vehicle 12. In the illustrated embodiment, the underside air inlet opening 22 is defined between a lower edge 14a of the facia member 14 and another component (e.g., air dam member 26 attached to underside bulkhead 28 in the illustrated embodiment), though this is not required. For example, in alternate embodiments, the underside air inlet opening could be defined in the facia member 14, particularly in a portion extending and/or defining an underside of the vehicle, defined in another component spaced rearwardly of the facia member 14, etc. The underside air inlet opening 22 allows for airflow to be admitted into the engine compartment 18 and directed toward the radiator 20 and condenser 21.

In the illustrated embodiment, a duct member 30 is interposed between the facia member 14 and the radiator 20. More particularly, the duct member 30 extends upward from a leading edge 22a of the opening 22, which is defined in the illustrated embodiment by the underside end 14a of the facia member 14, and directs air flow entering the underside air inlet opening 22 toward the radiator 20. In the illustrated embodiment, the duct member 30 at least partially blocks the radiator 20 (i.e., blocks air flow from entering through the facia 14, or openings therein, and passing directly to the radiator 20) and defines a duct passageway 32 extending from the underside opening 22 of the vehicle 10 to the radiator 20. The duct member 30 can supplement airflow to the radiator 20 and can also advantageously increase flow through the condenser 21.

As will be described in more detail below, at least one duct opening (e.g., duct openings 34, 36) is defined in the duct member 30 for supplementing air flow to the radiator 20 from the underside opening 22. That is, the at least one duct opening allows a supplemental air flow to pass through the duct member 30 to the radiator 20. More particularly, in the illustrated embodiment, the at least one duct opening includes first and second duct openings 34, 36. Accordingly, opening 34 can be the first opening and opening 36 can be the second opening, the openings 34, 36 allowing a supplemental air flow to pass through the duct member 30 to the radiator 20. As shown, the duct member 30 can include a flared lower portion 60 adjacent the underside opening 22 and the duct openings 34, 36 can be defined in this flared lower portion 60. More specifically, the duct openings 34, 36 can be defined adjacent lateral edges of the duct member 30.

A grill opening 40 is defined in the facia member 14 for directing air flow to the radiator 20 over the duct member 30. In the illustrated embodiment, the grill opening 40 comprises an upper opening 40a and a lower opening 40b. As best shown in FIG. 2, air flow entering through the grill openings 40a, 40b can pass directly to the radiator 20 over an upper end 30a of the duct member 30. This air flow path from the grill opening 40 defined in the facia member 14 to the radiator 20 can be referred to as a grill air flow path. In the illustrated embodiment, the grill air flow path extends from the grill opening 40 to the radiator 20 and passes over the upper end 30a of the duct member 30. As shown, the duct member 30 extends upward across a substantial portion of the radiator 20 in the illustrated embodiment reducing a cross-sectional area through which the grill air flow path passes.

At least one auxiliary opening (e.g., auxiliary openings 42, 44) is defined in the facia member 14 and is fluidly connected to the at least one duct opening defined in the duct member 30. In the illustrated embodiment, the at least one auxiliary opening includes first and second auxiliary openings 42, 44 that are laterally spaced apart below the grill opening 40. The first auxiliary opening 42 is fluidly connected to the first duct opening 34 and the second auxiliary opening 44 is fluidly connected to the second duct opening 36. Accordingly, airflow entering the first auxiliary opening 42 is directed to the first duct opening 34 and airflow entering the second auxiliary opening 44 is directed to the second duct opening 36.

The front end structure 10 can further include an auxiliary duct member (e.g., auxiliary duct members 50, 52) defining a duct passage from the at least one auxiliary duct opening to the at least one duct opening. In the illustrated embodiment, first auxiliary duct member 50 defines a first duct passage 54 extending from the first auxiliary opening 42 to the first duct opening 34 and second auxiliary duct member 52 defines a second duct passage 56 from the second auxiliary duct 44 to the second duct opening 36. In this regard, each of the auxiliary duct members 50, 52 extends between respective ones of the auxiliary openings 40, 42 defined in the facia member 14 and the duct openings 34, 36 defined in the duct member 30.

In particular, each of the auxiliary duct members 50, 52 define the respective duct passage 54, 56 as a sealed passage or sealed duct passageway extending from the respective one of the auxiliary openings 42, 44 to a respective one of the duct openings 34, 36 defined in the duct member 30. As a sealed passage or passageway, substantially all air flow entering the duct member 50 or 52 is directed there through to the duct openings 34, 36. In the illustrated embodiment, the auxiliary duct members 50, 52 extend entirely around the respective duct passages 54, 56 such that no airflow (or substantially no air flow) can escape from the auxiliary duct members 50, 52 without passing through the openings 42, 44 or 34, 36.

As shown, the cross-sectional area of the fascia openings 42, 44 can be respectively greater than a corresponding cross-sectional area of the duct openings 34, 36. More specifically, each auxiliary duct member 50, 52 can have a reduced lateral cross-section adjacent the duct openings 34, 36 relative to a lateral cross-section adjacent the auxiliary openings 42, 44. This imparts increased velocity to air flow entering the auxiliary openings 42, 44 and passing through to the duct openings 34, 36. As best shown in FIG. 3, each of the auxiliary openings 42, 44 defined in the facia member 14 extends between a first outer lateral side 42a, 44a and a second inner lateral side 42b, 44b. Likewise, each of the duct openings 34, 36 defined in the duct member 30 extends respectively between a first outer lateral side 34a, 36a and a second inner lateral side 34b, 36b. As shown in the illustrated embodiment, the first outer lateral sides 34a, 36a are respectively offset laterally inwardly relative to the first outer lateral sides 42a, 44a. Also in the illustrated embodiment, the second inner lateral sides 34b, 36b are respectively generally co-linear with the respective second inner lateral sides 42b, 44b.

Figure 4:
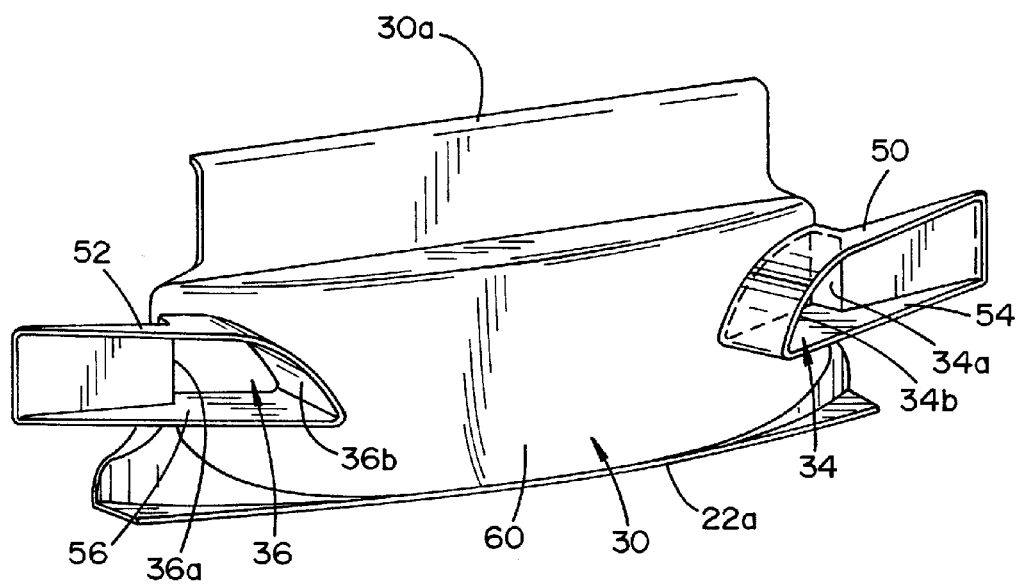
FIG. 4 is a perspective view of a duct member of the front end structure shown in isolation.
Figure 5:
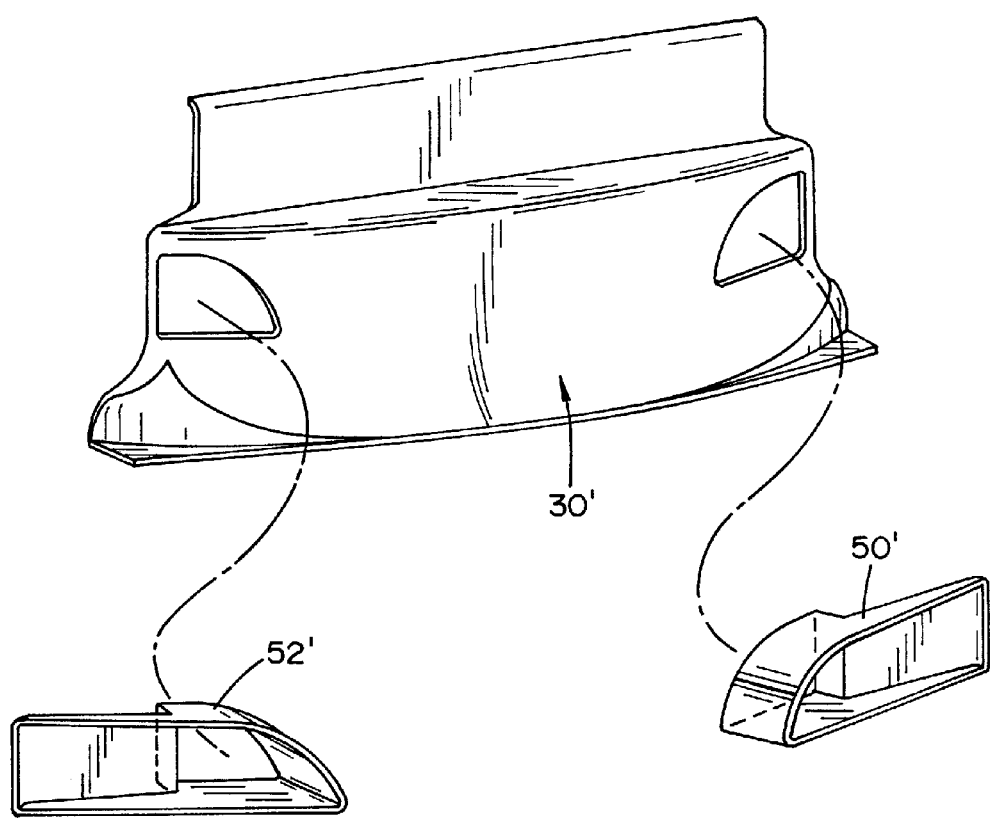
FIG. 5 is a perspective view of a duct member shown according to an alternate embodiment wherein the duct member includes auxiliary duct members for channeling air flow through auxiliary openings defined through the duct member.

The auxiliary duct members 50, 52 can be formed integrally with the duct member 30 or formed separately from the duct member 30. In one embodiment, with additional reference to FIG. 4, the duct members 50, 52 are integrally formed with the duct member 30. For example, the duct member 30 with the duct members 50, 52 integrally formed therewith can be molded from a plastic material, though this is not required. In an alternate embodiment, with reference to FIG. 5, duct members 50', 52' can be separately formed from a duct member 30' and then secured to the duct member 30' or arranged to be in position relative to the duct member 30'. In all other respects, the auxiliary duct members 50', 52' and the duct member 30' can be the same or similar to the auxiliary duct members 50, 52 and the duct member 30.

A method for supplying air flow to a radiator inside an engine compartment of a vehicle will now be described. In the method, air flow from an underside air inlet opening such as opening 22 is directed to the radiator 20 with a duct member 30. In addition, supplemental air flow is directed through a duct opening, such as duct opening 34 or 36, defined in the duct member 30 to the radiator 20 to supplement air flow from the underside air inlet opening 22. The front end structure 10 allows ducting from an underside of the vehicle 12, while minimizing or controlling air flow coming in through the facia member 14. In particular, the controlled auxiliary openings 42, 44 allow air flow to enter and pass to the radiator 20 in addition to the bottom duct opening 22.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A front end structure for a vehicle, comprising:
   a fascia member defining a forward end of an engine compartment of the vehicle;
   a radiator disposed in the engine compartment rearwardly spaced from the fascia member;
   a duct member interposed between the fascia member and the radiator, the duct member at least partially blocking airflow to the radiator and defining a duct passage extending from an underside opening of the vehicle to the radiator thereby defining an underside airflow path;
   a grill opening defined in the fascia member to admit and direct airflow to a front side of the radiator by passing over the duct member, the duct member at least partially blocking the airflow from the grill opening from passing to the radiator; and
   at least one duct opening defined in the duct member allowing a supplemental airflow to pass from an auxiliary opening defined in the fascia member through the duct member and to the radiator along a supplemental airflow path to supplement airflow to the radiator from the underside opening, wherein the underside airflow path converges with the supplemental airflow path.

2. The front end structure of claim 1 further including:
at least one auxiliary opening defined in the fascia member and fluidly connected to the at least one duct opening defined in the duct member.

3. The front end structure of claim 2 further including:
an auxiliary duct member defining a duct passage from the at least one auxiliary duct opening to the at least one duct opening.

4. The front end structure of claim 3 wherein the auxiliary duct member defines a sealed passage from the at least one auxiliary opening to the at least one duct opening.

5. The front end structure of claim 4 wherein a cross-sectional area of the at least one auxiliary duct opening is greater than a cross-sectional area of the at least one duct opening.

6. The front end structure of claim 3 wherein the auxiliary duct opening is integrally formed with the duct member.

7. The front end structure of claim 1 wherein the duct member includes a flared lower portion adjacent the underside opening and said at least one duct opening is defined in said flared lower portion.

8. The vehicle front end of claim 1 wherein the duct opening defined in the duct member is a first opening and the vehicle front end further includes a second opening defined in the duct member that also allows a supplemental airflow to pass through the duct member to the radiator, the second opening laterally spaced apart from the first opening.

9. A front end structure for a vehicle, comprising:
a fascia member defining a forward end of an engine compartment of the vehicle;
a radiator disposed in the engine compartment rearwardly spaced from the fascia member;
a duct member interposed between the fascia member and the radiator, the duct member at least partially blocking airflow to the radiator and defining a duct passage extending from an underside opening of the vehicle to the radiator,
a grill opening defined in the fascia member to admit and direct airflow to a front side of the radiator and over the duct member, the duct member at least partially blocking the airflow from the grill opening from passing to the radiator;
at least one duct opening defined in the duct member to supplement airflow to the radiator from the underside opening;
at least one auxiliary opening defined in the fascia member and fluidly connected to the at least one duct opening defined in the duct member,
wherein the at least one auxiliary opening includes first and second auxiliary openings that are laterally spaced apart below the grill opening and the at least one duct opening includes first and second duct openings, the first auxiliary opening fluidly connected to the first duct opening and the second auxiliary opening fluidly connected to the second duct opening.

10. A front end structure for a vehicle, comprising:
a fascia member defining a forward end of an engine compartment of the vehicle;
a radiator disposed in the engine compartment rearwardly spaced from the fascia member;
a duct member interposed between the fascia member and the radiator, the duct member at least partially blocking the radiator and defining a duct passage extending from an underside opening of the vehicle to the radiator;
at least one duct opening defined in the duct member for supplementing airflow to the radiator from the underside opening; and
at least one auxiliary opening defined in the fascia and fluidly connected by a sealed passageway to the at least one duct opening defined in the duct, the sealed passageway defined by an auxiliary duct member extending between the at least one auxiliary opening and the at least one duct opening.

11. The front end structure of claim 10 wherein the auxiliary duct member is formed integrally with the duct member or formed separately from the duct member.

12. The front end structure of claim 10 wherein the auxiliary duct member has a reduced lateral cross section adjacent the at least one duct opening relative to a lateral cross section adjacent the at least one auxiliary opening.

13. A vehicle front end, comprising:
a fascia member defining a forward end of an engine compartment of a vehicle;
a radiator disposed in the engine compartment rearwardly of the fascia member;
an underside air inlet opening defined in an underside of the vehicle;
a duct member extending upward from a leading edge of the underside air inlet opening and directing airflow entering the underside air inlet opening toward the radiator;
a duct opening defined in the duct member that allows a supplemental airflow to pass through the duct member to the radiator; and
an auxiliary duct member extending between an auxiliary opening defined in the fascia member and the duct opening defined in the duct member, the auxiliary duct member defining a sealed duct passageway between the auxiliary opening defined in the fascia member and the duct opening defined in the duct member.

14. The vehicle front end of claim 13 further including a grille opening defined in the fascia member, a grille airflow path extends from the grille opening to the radiator and passes over an upper end of the duct member.

15. The vehicle front end of claim 13 wherein the auxiliary opening defined in the fascia member extends between a first outer lateral side and a second outer lateral side, the duct opening defined in the duct member extends between a first inner lateral side and a second inner lateral side, the first inner lateral side offset laterally inwardly relative to the first outer lateral side.

16. The vehicle front end of claim 15 wherein the second inner lateral side is generally collinear with the second outer lateral side.

17. The vehicle front end of claim 13 wherein the auxiliary duct member is integrally formed with the duct member.

18. A method for supplying airflow to a radiator inside an engine compartment of a vehicle, comprising:
directing airflow from an underside air inlet opening of the vehicle along an underside airflow path to the radiator with a duct member, the duct member at least partially blocking airflow to the radiator;
directing supplemental airflow along a supplemental airflow path extending from an auxiliary opening defined in a fascia member through a duct opening defined in the duct member to the radiator to supplement airflow from the underside air inlet opening, wherein the underside airflow path converges with the supplemental airflow path; and
directing airflow from a grill opening defined in the fascia member above the auxiliary opening to a front side of the radiator by passing over the duct member.

* * * * *